United States Patent [19]

Rudaz

[11] Patent Number: 4,599,713
[45] Date of Patent: Jul. 8, 1986

[54] SEISMIC DETECTOR

[75] Inventor: Jean A. Rudaz, Noisy sur Ecole, France

[73] Assignee: Compagnie General de Geophysique, Massy, France

[21] Appl. No.: 587,903

[22] Filed: Mar. 9, 1984

[30] Foreign Application Priority Data

Mar. 30, 1983 [FR] France ................. 83 05232

[51] Int. Cl.⁴ .................. G01V 1/16; H04R 15/00; H04R 11/00
[52] U.S. Cl. ........................ 367/178; 367/188; 181/122
[58] Field of Search ............. 367/140, 141, 149, 152, 367/159, 160, 162, 165, 173, 176, 178, 182, 188, 13, 15, 172, 181, 911, 912; 181/122, 110, 112, 102, 104

[56] References Cited

U.S. PATENT DOCUMENTS

| | | | |
|---|---|---|---|
| 2,740,945 | 4/1956 | Howes | 367/24 X |
| 2,846,662 | 8/1958 | Sparks | 181/104 X |
| 3,158,831 | 11/1964 | Boyer | 367/13 |
| 3,311,873 | 3/1964 | Schloss | 367/157 X |
| 3,332,057 | 1/1965 | Pavey, Jr. | 367/159 |
| 3,932,834 | 1/1976 | Sutherland | 181/122 X |
| 3,988,620 | 10/1976 | McDavid | 367/24 X |
| 4,092,628 | 5/1978 | Hall, Jr. | 181/122 X |
| 4,134,097 | 1/1979 | Cowles | 367/13 |
| 4,163,206 | 7/1979 | Hall, Jr. | 367/160 |
| 4,437,175 | 3/1984 | Berni | 181/104 X |
| 4,438,292 | 3/1984 | Woodall | 367/188 X |

FOREIGN PATENT DOCUMENTS 1526289 9/1978 United Kingdom .

Primary Examiner—Charles T. Jordan
Assistant Examiner—Brian Scott Steinberger
Attorney, Agent, or Firm—Schwartz, Jeffery, Schwaab, Mack, Blumenthal & Evans

[57] ABSTRACT

A seismic detector comprises a casing the lower part (10) of which is provided with a plurality of apertures (19). A hydrophone transducer (70) comprising an annular ceramic member provided with metallized surfaces (71,72) is mounted in the casing and defines with the casing an enclosure (65) which houses a geophone (60). The outer face (71) of the hydrophone transducer (70) is subject to the ambient hydrostatic pressure via the apertures (19). The bottom of the casing is provided with a protuberance (11) to which a spike (12) is attached. The seismic detector can work in both hydrophonic and geophonic modes.

10 Claims, 6 Drawing Figures

FIG_1

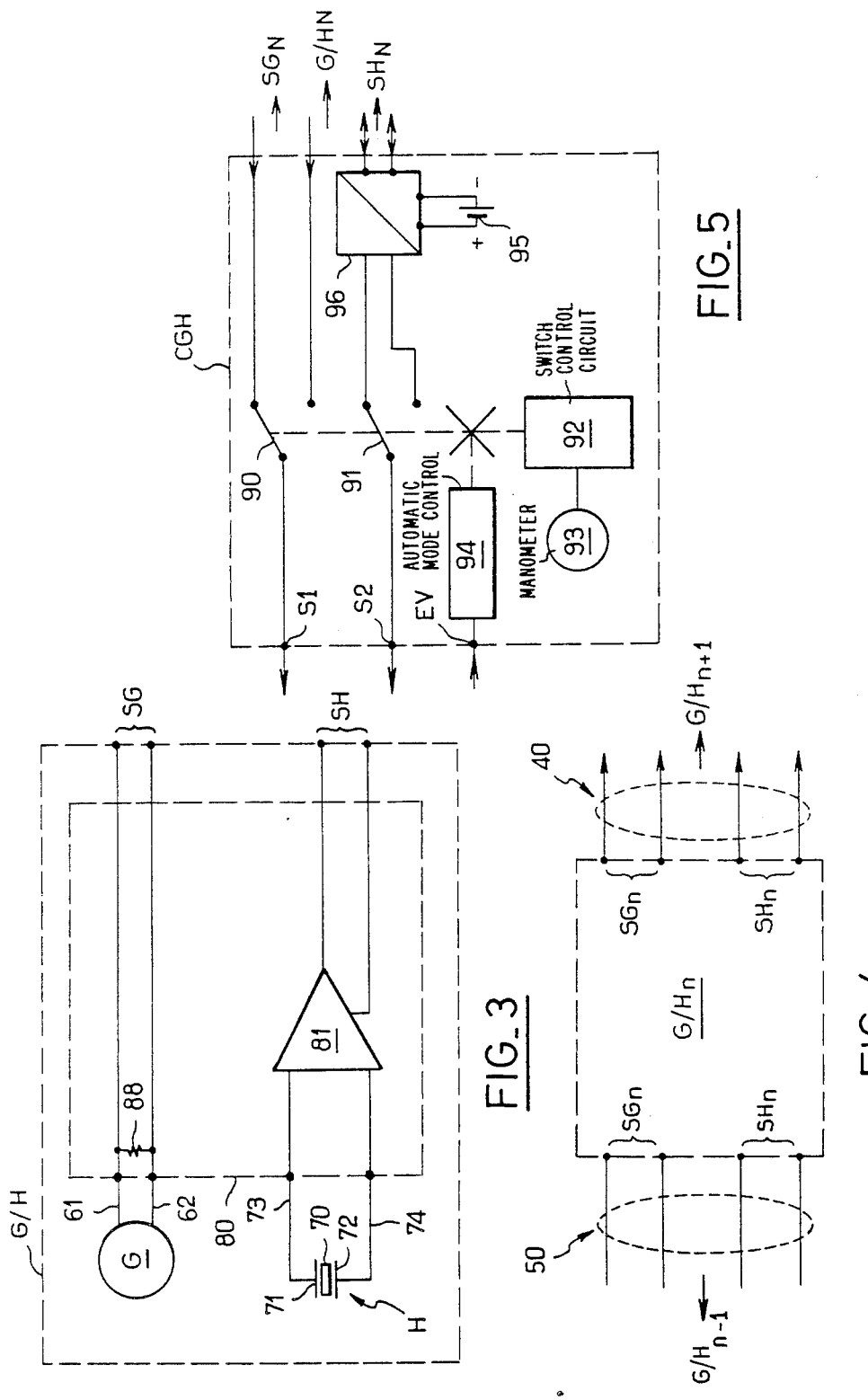

SEISMIC DETECTOR

FIELD OF THE INVENTION

The present invention relates to a seismic detector for the seismic prospecting of the subsoil.

BACKGROUND OF THE INVENTION

A seismic prospecting assembly comprises detectors disposed in a predetermined configuration on the gournd and connected by cables or radio to a central recording station. The assembly is of course completed by sources of artificial seismic shocks.

On land the detectors are geophones. At sea they are hydrophones. These remains the intermediate case of the shoreline or very marshy zones (shallow water) where geophones and hydrophones must be used jointly in the same apparatus. It is moreover desirable to provide a geophone and hydrophone at those locations for the detector which are sometimes dry and sometimes submerged (for example, by the tides). Land operators must therefore modify the connection of each particular "brace" (elementary line of detectors) every time to change over from the geophonic to the hydrophonic mode, and vice versa.

The result is either a substantial lengthening of the time of collecting seismic data, or the need to make do with incomplete information if during measurement the geophones were submerged, or the hydrophones were dry. Hitherto no satisfactory solution to this problem has been suggested.

It is an object of the invention to provide a detector adapted to perform the functions of a geophone and a hydrophone interchangeably and reliably.

SUMMARY OF THE INVENTION

According to the present invention there is provided a seismic detector comprising:

(a) a casing having a plurality of appertures therein;
(b) a hydrophone transducer disposed in said casing and defining with said casing an enclosure within said casing; and
(c) a geophone within said enclosure; wherein the outer face of said hydrophone transducer is subject to the ambient hydrostatic pressure via said appertures.

Preferably, said enclosure is sealing tight.

Advantageously, said hydrophone transducer comprises a tubular ceramic member disposed circumjacent said geophone. Preferably, said tubular ceramic member is of circular cross-section, said geophone is tubular with a circular cross-section, and said tubular ceramic member and said geophone are substantially co-axial.

Preferably, the inner and outer faces of said hydrophone transducer are metallized.

Advantageously, said casing contains an impedance reducing device connected to said hydrophone transducer. Preferably, said impedance reducing device comprises an operational amplifier.

Desirably, said casing contains a damping resistance connected in parallel with the output of said geophone.

Preferably, said casing is provided with an attachment for a spike whereby said seismic detector can be firmly mounted on the ground.

Advantageously, said casing is providing with at least one passageway for accommodating an electric cable.

In a preferred embodiment, (d) the base of said casing is provided with a groove which opens upwardly and accommodates the bottom of said hydrophone transducer; and
(e) the inside of said casing is provided with a supporting device which includes a groove which opens downwardly and accommodates the top of said hydrophone transducer.

Preferably, said casing is provided with an annular shoulder surmounted by a screwthread and said supporting device comprises:

(f) a flange which is provided with said groove which opens downwardly;
(g) a washer which bears on said flange and on the upper surface of said geophone; and
(h) a threaded ring which engages in said screwthread and which clamps said washer and said flange against said annular shoulder of said casing.

The present invention also provides an assembly comprising:

(i) at least two seismic detectors according to the invention;
(j) a control unit;
(k) an electric cable connecting said control unit to the first of said seismic detectors;
(l) an electric cable connecting said first seismic detector to said second seismic detector; and
(m) means in said control unit for switching said seismic detectors between their geophonic and their hydrophonic modes.

Preferably, said assembly further comprises:

(n) means to amplify the signals from said hydrophones,
(o) means connecting said hydrophones so that said control unit, in use, receives a signal equal to the sum of the signals from said hydrophones; and
(p) means connecting said geophones in series, parallel or series-parallel in a manner such that the output of said geophones can be transmitted to said control unit via a single wire. If desired, means may be provided for automatically switching said seismic detectors between their geophonic and hydrophonic mode as appropriate.

Preferred embodiments of the invention allows geophone-hydrophone switching to be performed without manual disconnection. They also have the further advantage that the casing accommodates the electronic pre-processing system required by the hydrophone.

Other features and advantages of the invention will become apparent from an examination of the detailed description which follows, and the accompanying drawings, in which:

BRIEF DESCRIPTION OF THE DRAWINGS

FIG. 3 shows the internal electric circuit of the detector shown in FIGS. 1 and 2;

FIG. 4 is a diagram of the connection to the detector shown in FIG. 3;

FIG. 5 is the internal electric circuit of a switching block; and

DETAILED DESCRIPTION OF THE PREFERRED EMBODIMENTS

Figure 1:
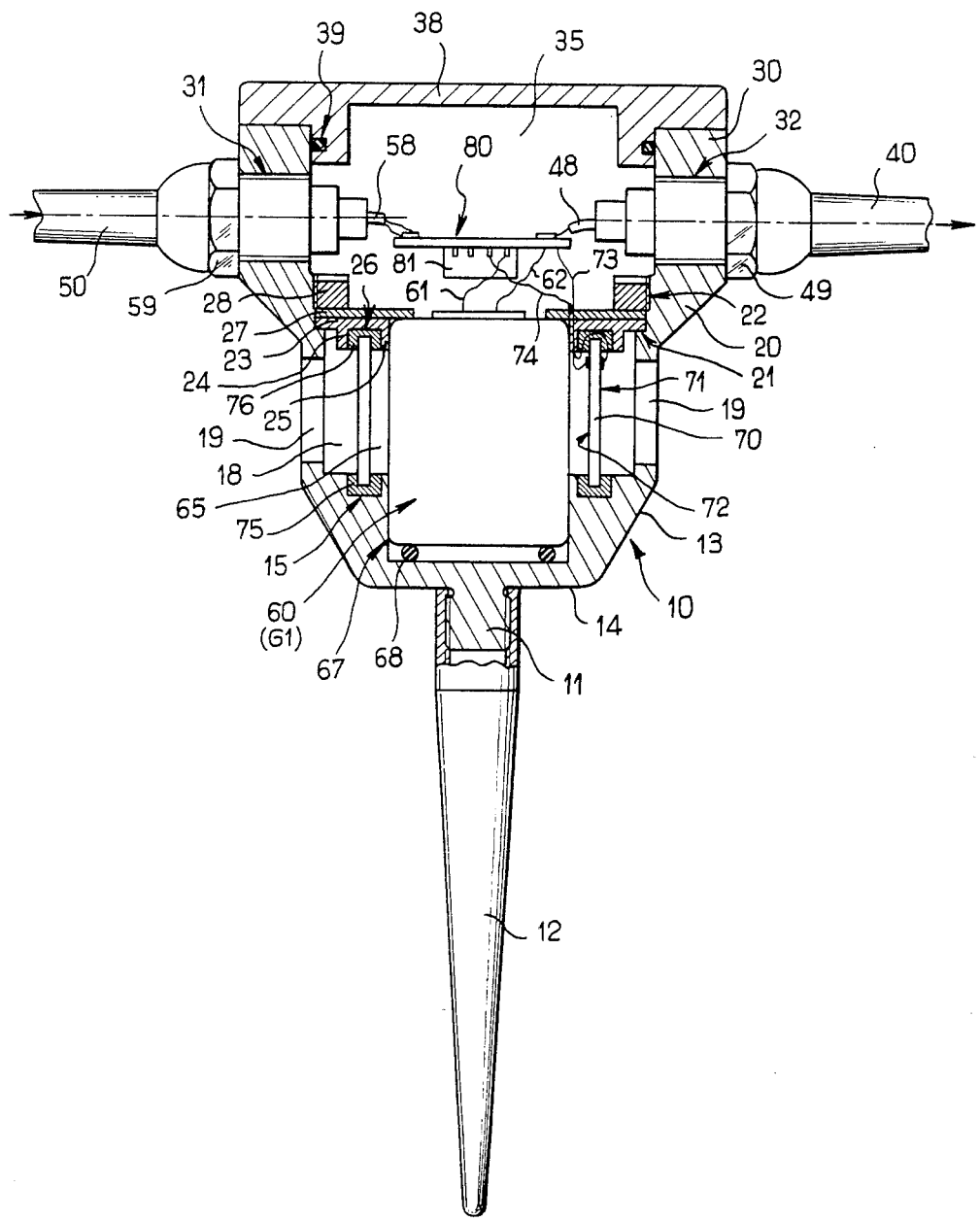
FIG. 1 is a partially sectioned view of a geophone/hydrophone seismic detector according to the present invention.
Figure 2:
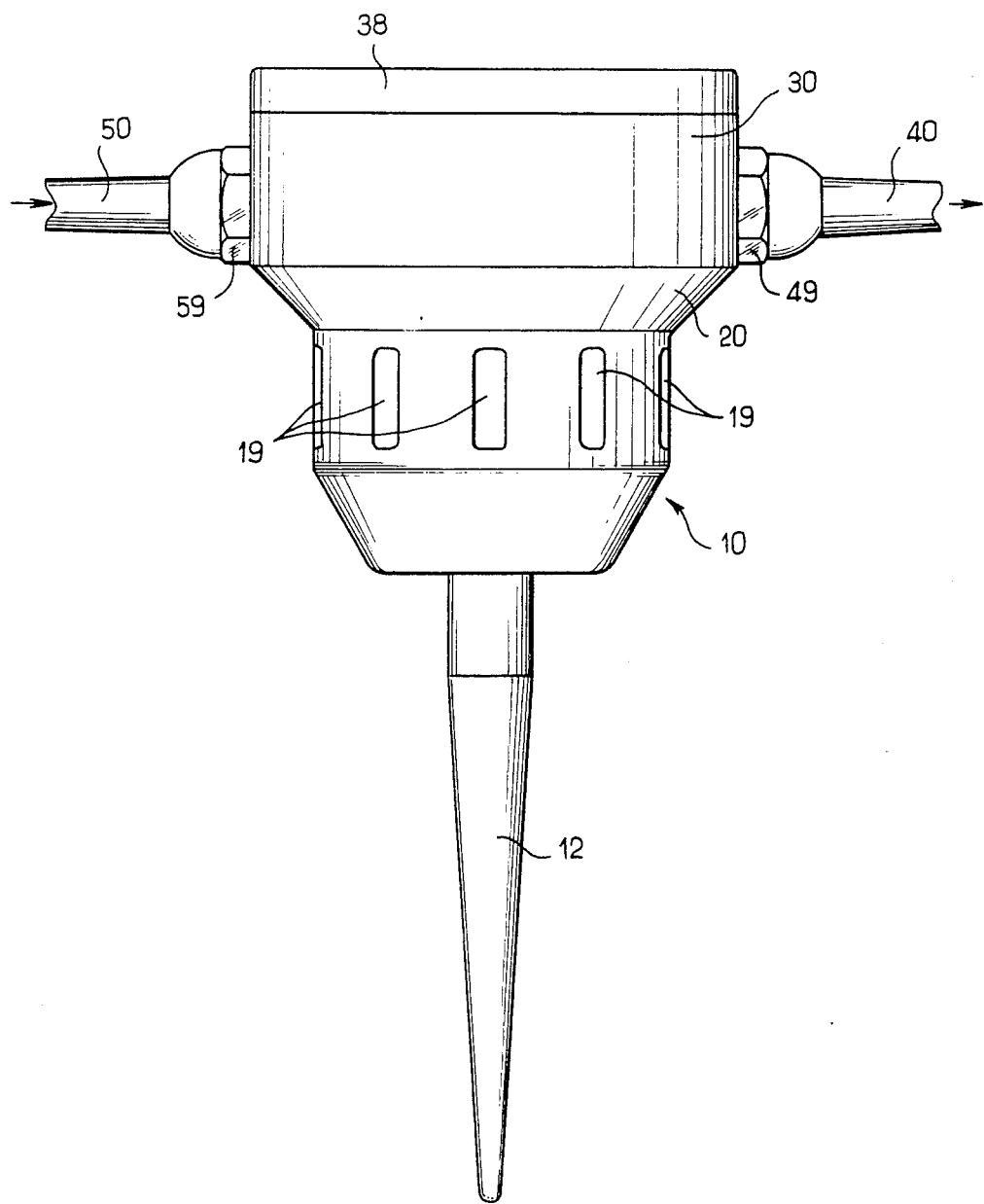
FIG. 2 is an external view of the detector.

The detector illustrated in FIGS. 1 and 2 comprises a casing of revolution, comprising a lower part 10, an upper part 30 of larger diameter than the lower part, and a conical transition part 20. The upper part is closed at the top by a cover 38 with a seal 39.

The lower part terminates in a screwthreaded protuberance 11 to which a spike 12 may be attached In a conventional geophone-type detector, the spike 12 secures the detector to the ground. The lower part 10 is rendered completely sealing-tight and accommodates the geophone itself. In turn, the upper part 30 defines at least one, and preferably two, passages through which electrical connections extend to the outside. This enables the detectors to be arranged in line, as will be described hereinafter with reference to FIG. 3.

The difficulty encountered in the aforementioned shallow water zones resides in the detector used;

in water it is difficult to firmly implant a geophone which is necessary to obtain signals of satisfactory quality. Moreover, the sealing-tightness of the casing, which is considerable even for opeating on land, must be even more so to operate in water;
in water a hydrophone gives satisfactory results, but it becomes unusable out of water.

The present invention proposes a detector of novel structure which simultaneously comprises both a hydrophone and a geophone, and is therefore able to operate equally well on land and in water, with the provision of very simple switching.

As shown in FIGS. 1 and 2, the lower part of the outside wall of the casing 10 is perforated after the fashion of a grating 19. Preferably, the openings are long, directed downwards, and regularly spaced out. A hydrophone transducer 70 comprising a tubular ceramic member provided wit metalised surfaces 71 and 72 is mounted sealing-tight inside the casing opposite the perforations 19 and around the geophone 60. The external metallized face 71 of the transducer 70 is therefore subjected via the perforations 19 to the ambient hydrostatic pressure. Its inside face 72 is subjected to the gas pressure inside the casing. The transducer 70 can therefore opeate as a hydrophone. Moreover, it co-operates with the remainder of the casing to define a sealing-tight enclosure formed, in this embodiment, by two parts 65 and 35, the first of which contains and isolates the geophone 60, while the second takes the electrical connections and the preprocessing circuit included in a printed circuit 80.

More precisely, the lower part 10 of the casing comprises a lower frustoconical part 13 terminating in a horizontal part 14. Coaxially the part 13 is provided with a socket 67. The socket 67 is generally cylindrical and is coaxial with the casing. It accommodates a geophone 60 which is, for example, model SM4/GSC 20 D of the Geo-Source/Geo-Space Companies. The geophone rests on the bottom of the socket via a resilient toroidal joint 68. Inside the casing, between the socket 67 and the outside wall, the member 13 comprises a flat annular part disposed at a level slightly lower than the bottom of the apertures 19. A circular groove 15, which opens upwardly, is formed in the flat annular part coaxially with the casing. The groove accommodates a joint 75 which receives the lower end of the tubular ceramic hydrophone 70.

The interior of the transition part 20 of the casing comprises an annular shoulder 21 surmounted by a screwthread 22 both of which are coaxial with the casing. This arrangement serves for locating an annular supporting device formed by members 22-28. The purpose of this device is on the one hand to ensure the suspension of the geophone 60 in its housing, and on the other to define between the geophone and the outside part of the casing a partition which is provided with a second circular groove 26 similar to the groove 15. In this way the tubular ceramic member 70 is accommodated between the aforementioned joint 75 and a joint 76 disposed in the groove 26. It separates the bottom of the detector into a cavity 18 communicating with the outside via the grating 19, and a cavity 65 which houses the geophone in such a way that it is fully sealed off from the outside.

In the particular embodiment disclosed, the supporting device comprises firstly a flange 23 which bears directly against the shoulder 21. The flange is annular and is provided with a longitudinally extending, U-shaped, downwardly turned reinforcement 24, 25. In other words, the flange is provided with a downwardly extending portion 25 which contacts the geophone and another downward extending portion 24 in the space separating the geophone from the outside wall. This arrangement defines the groove 26. A washer 27 is disposed above the flange and bears on the shoulder 21 and against the geophone 60. Lastly, a ring 28 engages in the screwthread 22 and clamps the assembly formed by the washer 27 and flange 23 on the shoulder 21.

The flange 23 is rigid, so as to ensure the rigid positioning of the hydrophone 70 with adequate stability to enable it to form a completely sealing-tight wall between the closed-in-side of the casing formed by the cavities 65 and 35, and the external cavity 18 which communicates with the outside. Although different materials can be used to make the joints 75 and 76, at present the Applicants prefer to use elastomers, for example, bicomponent polyurethane elastomers, capable of ensuring both sealing-tightness and electrical insulation between the two metallized faces of the ceramic hydrophone 70.

The washer 27 can have some resilience in the radial direction and possibly be prestressed, so as to enhance the suspension of the geophone in co-operation with the resilient joint 68.

The upper part 30 of the casing is formed with two symmetrical passages 31 and 32 via which electrical connections extend to the outside. The passages 31 and 32 house respectively an upstream cable 50, which will extend from another detector of the same kind, and a downstream cable 40, which will on the one hand take the connections coming from the or each upstream detector and add to such connection and contribution of the geophone incorporated in the casing.

The upper part of the detector comprises a printed circuit 80, illustrated in section. The circuit 80 can have an oblong shape terminating in two curvilinear sides enabling it to bear against the edges of the cavity 35. In its lower part, the circuit 80 comprises components such as an integrated amplifier 81. In its upper part the circuit 80 receives the connecting wires extending from the cores 48 and 58 of the cables 40 and 50 respectively. Lastly, from the mechanical aspect, it will be noted that the cables 40 and 50 are mounted sealing-tight on the bores 31 and 32 by clamping means 49 and 59.

The electric circuit of a detector, denoted by the reference G/H, will now be described with reference to FIG. 3.

The detector comprises internally a geophone 60, which has the reference G. Its two output terminals are connected via connections 61 and 62 to the terminals of a damping resistance 88 mounted on the printed circuit 80. On the side of the output cable 40, the connections 61 and 62 will themselves directly form the bifilar output SG of the geophone G.

The ceramic member 70 and its metallized faces 71 and 72 form a hydrophone H. The two metallized faces are connected via connections 73 and 74 to an impedance-reducing assembly which comprises an operational amplifier 81. The bifilar output SH of the hydrophone H is formed by the output of the amplifier 81.

Advantageously the power supply for the circuit 81 flows through the two wires of the output SH, a d.c. decoupling (not shown) being provided at the output of the amplifier 81. Each of the hydrophone connections therefore carries the power supply for the circuits in one direction and the information signal in the other direction.

FIG. 4 illustrates the way in which the nth detector G/Hn in FIG. 1 is connected in the brace. In practice each of the outputs SGn and SHn is duplicated, so that each detector G/H has four inputs (connected to the detector G/Hn−1 upstream by the cable 50) and four outputs (connected to the detector G/Hn+1 upstream by the cable 40). This arrangement enables the number of conductors required for transmitting the signal and supplying all the detectors of the brace to be limited, whatever their number may be, the detectors being connected in parallel or in series (thus limiting the number of conductors to four) or else in series-parallel, as will be seen hereinafter.

The detector G/Hn furthest downstream in the string is advantageously connected to a circuit which enables all the detectors of the brace to be switched between the geophonic and hydrophonic modes. The circuit diagram of such a circuit CGH is shown in FIG. 5.

The signals from the outputs SGN and SHN and containing the signals delivered by all the detectors of the brace arrive from its last pickup GHN in the right-hand part.

The signals coming either from the geophones or the hydrophones of the brace and intended for a recording or data-transmitting device are outputted in the left-hand part over a bifilar line S1, S2. Hydrophone-geophone switching is performed by switches 90, 91 which are controlled by a circuit 92 which detects the presence of water and is activated, for example, by a manometric detector 93. The automatic switching system can be overridden and replaced by manual switching performed by the land-based operator. If necessary, locking in the "automatic" mode can be performed by a circuit 94 controlled by a signal applied to an input EV of the casing and coming, for example, from a central data-collecting and system-controlling unit.

A direct voltage source 95 also supplies the hydrophones via a decoupling circuit 96 which allows the alternating signal delivered by the hydrophones to pass.

Figure 6:
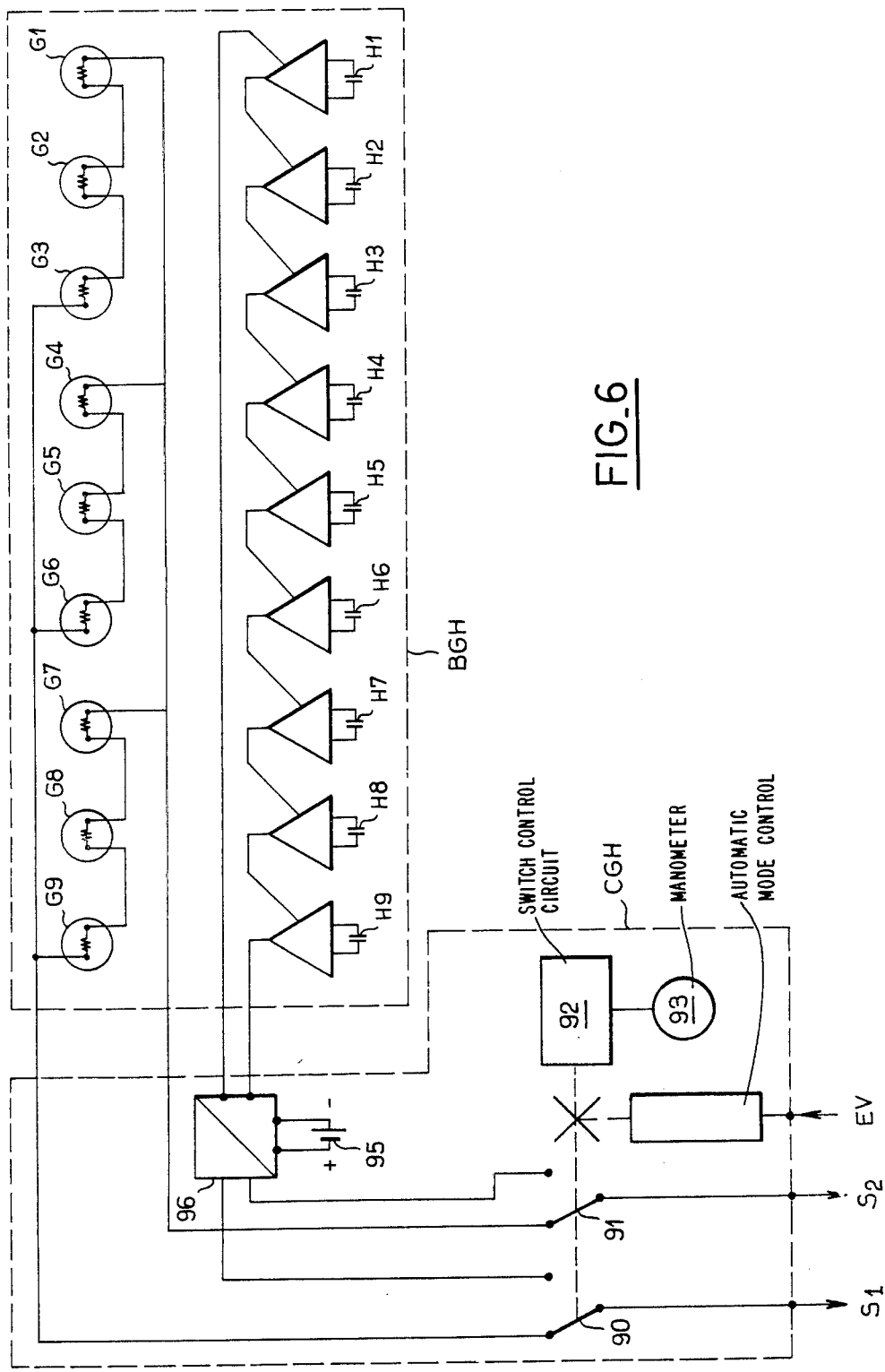
FIG. 6 is a diagram showing an example of a straightforward line of detectors according to the invention.

FIG. 6 illustrates diagrammatically a BGH brace of nine hydrophones H1-H9 and nine geophones G1-G9 which is connected to a switching circuit CGH such as that disclosed hereinbefore.

In the configuration illustrated, the nine geophones are linked in series-parallel in groups of three (thus limiting to three at most the number of conductors on the brace associated with the geophones), the amplifiers of the hydrophones being connected in cascade: in this way the summation of the signals is distributed right along the brace, the moreover only two wires are needed for transiting the signal from the hydrophones along the brace.

Of course, other combinations in parallel, series or series-parallel are possible, so that the conductors in the brace can be limited to a number which is independent of the number of transducers which the brace comprises.

What is claimed is:

1. A seismic detector, comprising:
    a casing having a hollow upper part and a hollow lower part;
    a spike connected to said lower part;
    a geophone mounted in said lower part in a position surmounting the connection for said spike;
    at least one passage formed in said upper part through which electrical connections extend to the outside of said housing casing;
    perforations formed in said lower part to form a grating through said lower part; and
    a hydrophone transducer comprising a generally cylindrical ceramic member having metalized faces, said hydrophone transducer being disposed inside said lower part in opposing relation to said perforation and in a position surrounding said geophone, said hydrophone transducer being watertightly sealed against said casing so as to seal said hollow lower part against ingress of water and such that an outside face of said hydrophone transducer is subjected through said perforations to ambient hydrostatic pressure while an inside surface of said hydrophone transducer is subjected to pressure inside said casing which contains said geophone.

2. A seismic detector according to claim 1 wherein said cylindrical ceramic member is coaxial with said geophone.

3. A seismic detector according to claim 1 including an impedance reducer disposed within the upper part of said casing and being connected to an electric output of the hydrophone.

4. A seismic detector according to claim 3 wherein said impedance reducer comprises an operational amplifier.

5. A seismic detector according to claim 3 including a damping resistance disposed within said upper part of said casing and connected in parallel to said electric output of said geophone.

6. A seismic detector according to claim 3 including a printed circuit board disposed in said upper part of said casing for mounting electric circuits in said upper part of said casing.

7. A seismic detector according to claim 1 wherein said lower part of said casing includes a socket which receives said geophone, said socket having an upper surface, a circular groove formed in said upper surface, said circular groove opening upwardly; a retaining means positioned in a central part of said casing, said retaining means including an annular supporting device for retaining said geophone in said socket, said retaining means including a second circular groove surrounding said geophone and opening downwardly in opposed relation to said first mentioned circular groove; sealing means disposed in said grooves and said cylindrical ceramic member being received in said sealing means disposed in said grooves.

8. A seismic detector according to claim 7 wherein said central part of said casing includes an annular shoulder surmounted by a screw thread and wherein said supporting means comprises a flange having a downwardly turned U-shaped protuberance forming said second groove, said flange bearing against said shoulder and a washer surmounting said flange, said washer having one portion bearing against said shoulder via said flange, and having another portion bearing against said geophone, and a ring engaging said screw threads and bearing against said washer to hold said washer and flange to said shoulder.

9. A seismic detector according to claim 1 wherein two symmetrical passages are formed in said upper part through which electrical connections extend to the outside of said casing and which accommodate an upstream cable connected to at least one additional seismic detector, and which accommodate a downstream cable for channeling signals from said at least one additional detector, from said geophone, and from said hydrophone, said downstream cable being connected to a casing for switching between a geophonic mode in which only signals from geophones are processed and a hydrophonic mode in which only signals from hydrophones are processed.

10. A seismic detector according to claim 1 in combination with a plurality of additional seismic detectors wherein the outputs of the hydrophones of said plurality of detectors are electrically connected in cascade so as to sum signals delivered by said hydrophones, the geophones of said detectors being connected together so as to output only a single geophone signal such that only one hydrophonic signal and one geophonic signal are output from said plurality of detectors, said only one hydrophonic signal and only one geophonic signal being provided to a switching circuit for selecting either a geophonic mode in which only said geophonic signal is processed and a hydrophonic mode in which only said hydrophonic signal is processed.

* * * * *

UNITED STATES PATENT AND TRADEMARK OFFICE
CERTIFICATE OF CORRECTION

PATENT NO. : 4,599,713
DATED : July 8, 1986
INVENTOR(S) : Jean A. Rudaz

It is certified that error appears in the above-identified patent and that said Letters Patent is hereby corrected as shown below: Title page:

Item [73], Change "Compagnie General de Geophysique" to --Compagnie Generale de Geophysique--

Signed and Sealed this

Fifth Day of April, 1988

Attest:

DONALD J. QUIGG

Attesting Officer

Commissioner of Patents and Trademarks